(12) United States Patent
Kim et al.

(10) Patent No.: US 7,184,110 B2
(45) Date of Patent: Feb. 27, 2007

(54) LIQUID CRYSTAL DISPLAY WITH MAIN FRAME COMPRISING A SHAFT MEMBER

(75) Inventors: Byoung Ku Kim, Kumi-shi (KR); Jae Bum Kim, Taegu-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 37 days.

(21) Appl. No.: 09/843,830

(22) Filed: Apr. 30, 2001

(65) Prior Publication Data

US 2002/0024623 A1 Feb. 28, 2002

(30) Foreign Application Priority Data

Aug. 21, 2000 (KR) ................ 2000-48432

(51) Int. Cl.
  *G02F 1/1333* (2006.01)
(52) U.S. Cl. .......................... 349/58; 349/60
(58) Field of Classification Search ................ 349/58
  See application file for complete search history.

(56) References Cited

U.S. PATENT DOCUMENTS 6,166,788 A * 12/2000 Ha et al. ................ 349/58
6,175,396 B1 * 1/2001 Kim et al. ................ 349/58
6,392,724 B2 * 5/2002 An et al. ................ 349/58
6,411,353 B1 * 6/2002 Yarita et al. ................ 349/59
6,593,979 B1 * 7/2003 Ha et al. ................ 349/58
6,600,394 B1 * 7/2003 Wang et al. ................ 333/235

FOREIGN PATENT DOCUMENTS

| JP | H04-040221 U | 4/1992 |
| JP | H04-081123 U | 7/1992 |
| JP | 11-281966 | 10/1999 |

* cited by examiner

*Primary Examiner*—Andrew Schechter
*Assistant Examiner*—Richard H Kim
(74) *Attorney, Agent, or Firm*—McKenna Long & Aldridge LLP

(57) ABSTRACT

A liquid crystal display device that is adapted for preventing a damage and a wrinkle of optical sheets caused by vibration or external impact. In the device, optical sheets are included in a backlight assembly. A main frame is mounted with the backlight assembly. At least one shaft is installed at the main frame to fix the optical sheets thereon. Accordingly, the optical sheets resist damage, such as a scratch, etc. caused by a motion of the liquid crystal display or external vibration. Furthermore, wrinkling of the optical sheets in a high temperature environment is minimized.

13 Claims, 6 Drawing Sheets

LIQUID CRYSTAL DISPLAY WITH MAIN FRAME COMPRISING A SHAFT MEMBER

This application claims the benefit of Korean Patent Application No. 2000-48432, filed on Aug. 21, 2000, which is hereby incorporated by reference.

BACKGROUND OF THE INVENTION

1. Field of the Invention

The present invention relates to a liquid crystal display, and more particularly to a liquid crystal display that is capable of preventing damage and wrinkling of optical sheets caused by external vibration or impact.

2. Discussion of the Related Art

Generally, as shown in FIG. 1 and FIG. 2, a liquid crystal module used as a display device in a notebook computer includes a main frame 14 disposed therein with a backlight assembly including a plurality of optical sheets 4, a light guide 6, a reflective sheet 8, a liquid crystal panel 2, a panel guide 12 surrounding the backlight assembly and the edge of the main frame 14, and a top case 10 surrounding the liquid crystal panel 2 and the edge of the panel guide. The main frame 14 is usually made from a molded material. Recently, however, the main frame 14 has been made from a metal having an excellent heatproof property (e.g., aluminum(Al)) consistent with a high-brightness television or a high-brightness monitor. The reflective sheet 8 is positioned at the bottom of the main frame 14, and the light guide 10 and the optical sheets 4 are disposed thereon. The liquid crystal panel 2 is mounted in the main frame 14 in such a manner to be positioned on the optical sheets 4. As shown in FIG. 3, the backlight assembly includes the reflective sheet 8, the light guide 10 and the optical sheets 4. Also, the backlight assembly further includes a lamp 21 opposed to an incidence surface of the light guide 10, and a lamp reflective plate 22 for improving an efficiency of a light emitted from the lamp 21 and being incident to the light guide 10. The optical sheets 4 consist of a diffusion sheet 4a, prism sheets 4b and 4c, and protective sheets 4d and 4e. In the liquid crystal panel, a liquid crystal is injected between two sheets of glass substrates. Polarizers are attached to each sheet of glass substrate. Liquid crystal pixel cells are each arranged in a matrix and are each driven with a thin film transistor (TFT). The panel guide 12 is bent to surround the side of the main frame 14 and the edges of the optical sheets 4. Similarly, the top case 10 is bent to surround the side of the panel guide 12 and the edge of the liquid crystal panel 2. The main frame 14, the panel guide 12 and the top case 10 are assembled by means of a screw (not shown).

In such a conventional liquid crystal module, the optical sheets 4 are secured to the inner side of the main frame 14 by means of double-face adhesive tape (not shown). However, if the liquid crystal module is subject to vibration or impact from the exterior thereof, then the optical sheets may receive damage, such as wrinkling or scratching, because the optical sheets are secured to the main frame 14 only by the double-face adhesive tape. Furthermore, in the process of assembly of the conventional liquid crystal module structure, the backlight assembly is assembled in "reverse". More specifically, in manufacture of the backlight assembly, the optical sheets 4, the light guide 6 and the reflective sheet 8 are first disposed on the panel guide 12, which has been turned upside down from its position in the final assembly. Thereafter the main frame 14 is disposed on and secured onto the reflective sheet 8. As a result, the conventional liquid crystal module has a problem in that, since the backlight assembly is assembled upside down as mentioned above, the assembly process has a high defect rate and low productivity.

SUMMARY OF THE INVENTION

Accordingly, the present invention is directed to a liquid crystal display that substantially obviates one or more of the problems due to limitations and disadvantages of the related art.

An object of the present invention is to provide a liquid crystal display that is adaptive for preventing damage and wrinkling of optical sheets caused by external vibration and impact.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device according to the present invention includes optical sheets included in a backlight assembly; a main frame mounted with the backlight assembly; and at least one shaft member installed at the mainframe to fix the optical sheets.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
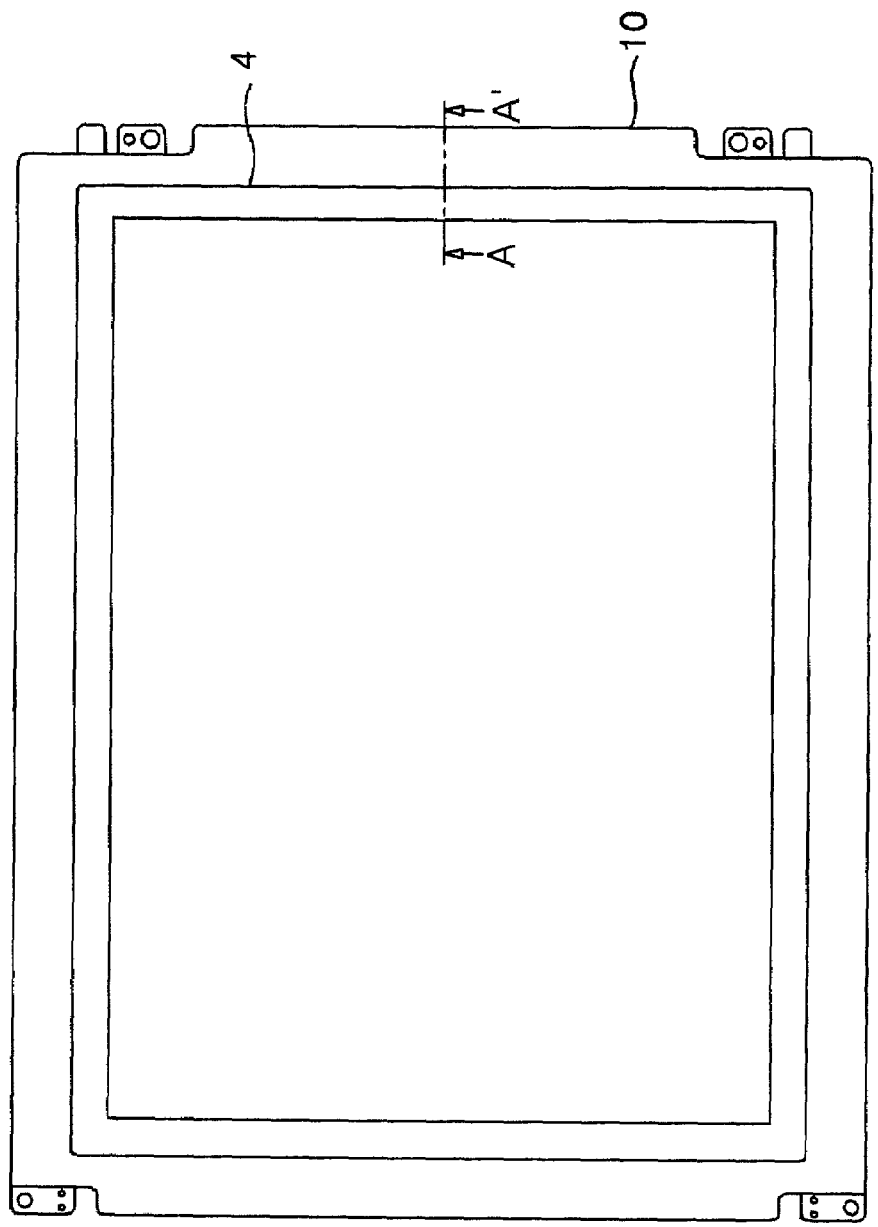
FIG. 1 is a plan view showing a structure of a conventional liquid crystal module.
Figure 2:
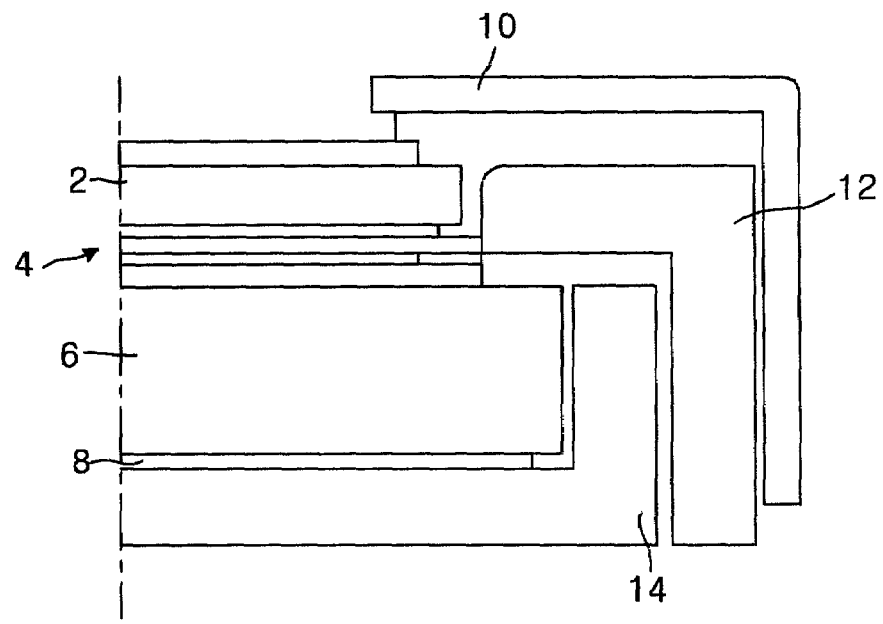
FIG. 2 is a section view of the liquid crystal module taken along the A–A' line in FIG. 1.
Figure 3:
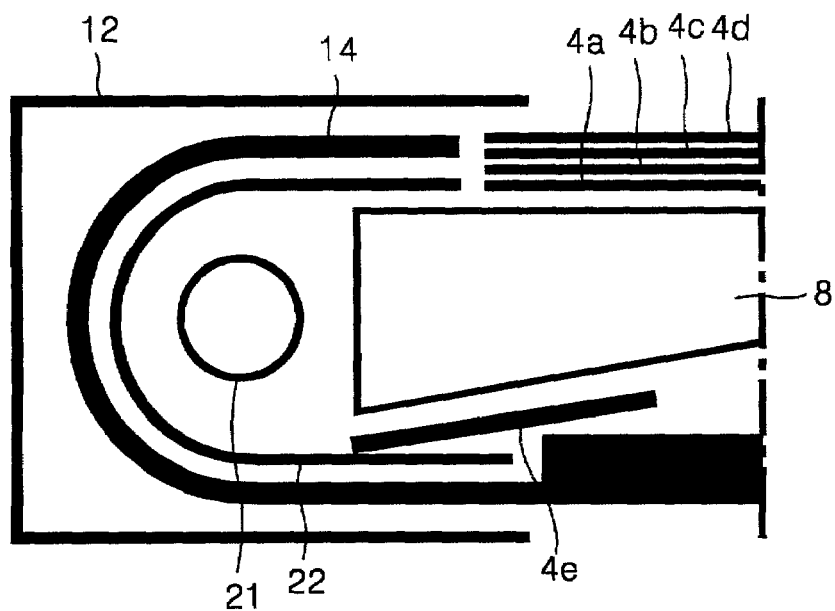
FIG. 3 represents a detailed configuration of the backlight assembly in the liquid crystal module in FIG. 1.
Figure 4:
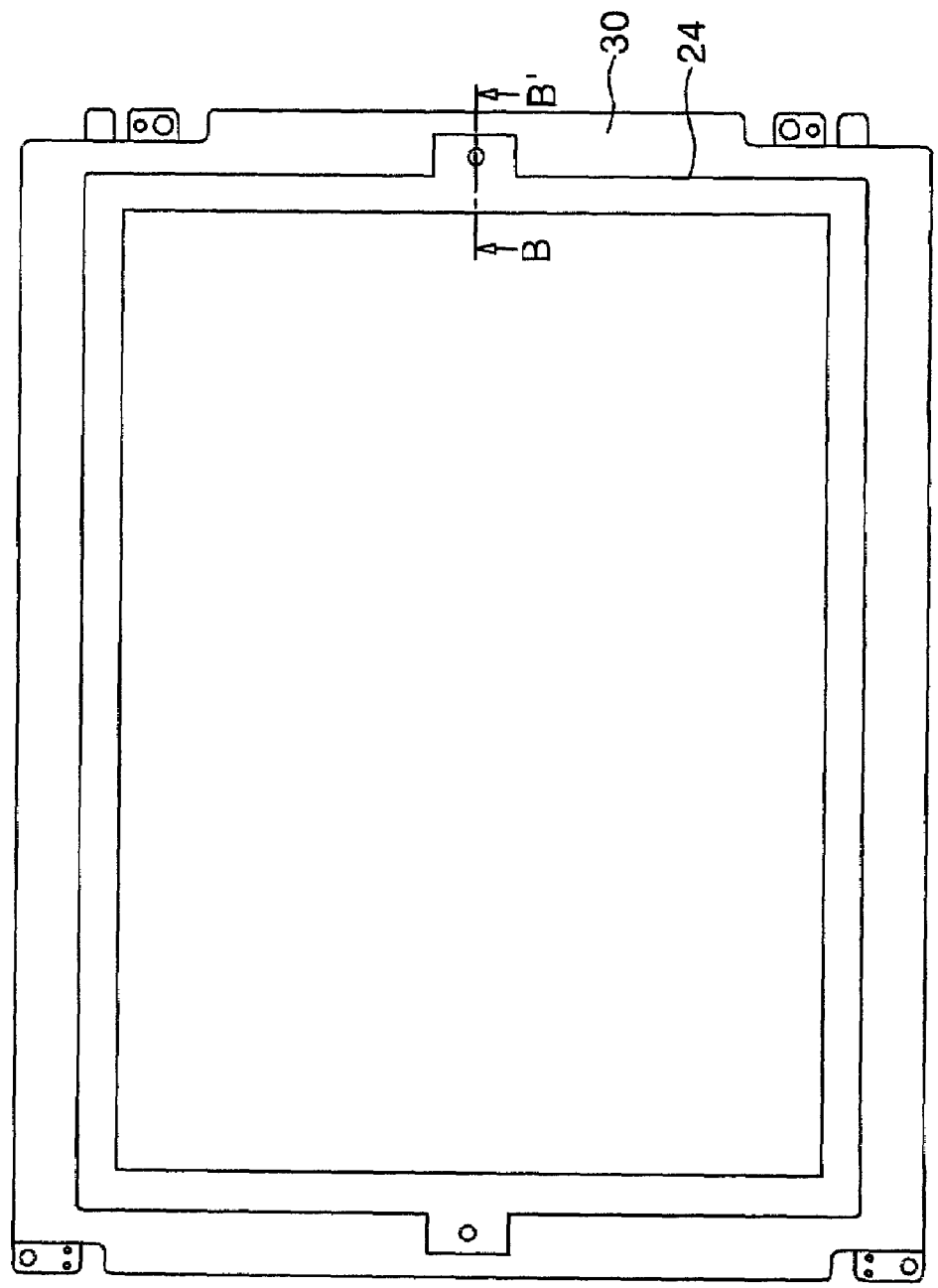
FIG. 4 is a plan view showing a structure of a liquid crystal module according to an embodiment of the present invention.
Figure 5:
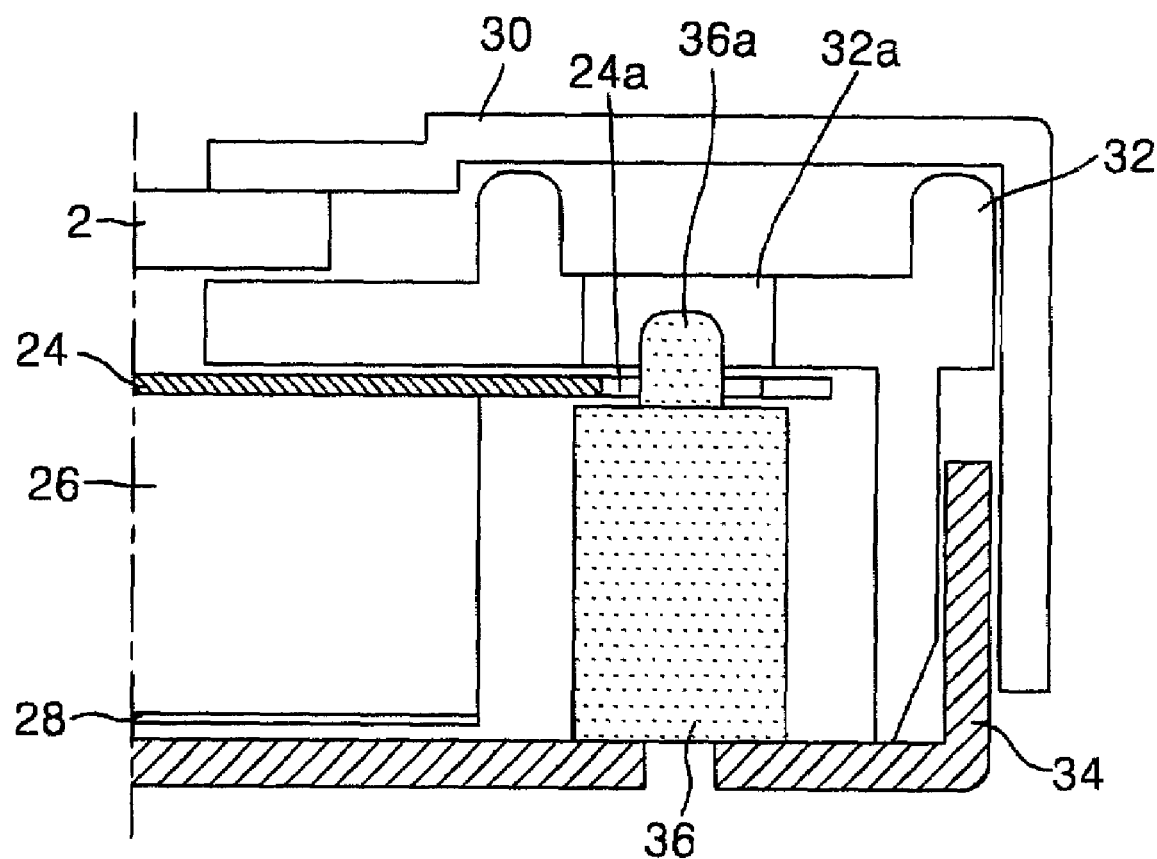
FIG. 5 is a section view of the liquid crystal module taken along the B–B' line in FIG. 1.

Referring to FIG. 4 and FIG. 5, there is shown a liquid crystal display (LCD) according to an embodiment of the present invention. The LCD includes a main frame 34 within which a backlight assembly having a plurality of optical sheets 24, a light guide 26 and a reflective sheet 28 are disposed, and a shaft 36 installed at the main frame 34 to fix the optical sheets 24. The main frame 34 is made from a molded material or a metal. The reflective sheet 28 is loaded on the bottom of the main frame 34, and the shaft 36 is secured to each edge of the main frame 34. The shaft 36 is made in a column shape and fixes and guides the optical sheets 24 at both sides of the optical sheets 24. A material of the shaft 36 is selected from a metal. To this end, the upper portion of the shaft 36 is provided with a column-shaped protrusion 36a having a smaller diameter than the lower portion of the shaft 36. Edges of the optical sheets 24 are extended to an opposite side of the shaft, and the center of the extended part of each optical sheet is provided with a hole 24a through which the protrusion 36a of the shaft 36 passes.

The LCD further includes a panel guide 32 for surrounding a backlight assembly and the edge of the main frame 34, and a top case 10 for surrounding the liquid crystal panel and the panel guide 32. The panel guide 32 is provided with a hole 32a through which the protrusion 36a of the shaft 36 passes. The panel guide 32 has one horizontal side surrounding the edges of the optical sheets 24 of the backlight assembly and a vertical side contacting the inner side of the main frame 34. The top case 30 has one horizontal side contacting the edge of the liquid crystal panel 2 and the protrusion of the panel guide 32 and other vertical side contacting the main frame 34 and the panel guide 32. The top case 30, the panel guide 32 and the main frame 34 are fixed with each other by means of a screw (not shown).

Since the optical sheets 24 are fixed with the aid of the shaft 36 secured onto the main frame 34, the present LCD can much better prevent damage and wrinkling generated under high temperature environment of the optical sheets 24 caused by a motion of the liquid crystal module or vibration from the exterior thereof in comparison to the conventional LCD in which the optical sheets 24 are fixed only by a double-face adhesive tape. By the engaging structure of the optical sheets 24 through the shaft 36, the backlight assembly is assembled in a normal direction within the main frame 34. In other words, the reflective sheet 28 and the light guide 26 are sequentially mounted within the main frame 34 in a state in which the main frame 34 is placed to expose the shaft 36, and thereafter the optical sheets 24 is disposed on the light guide 24 in such a manner that the protrusion 36a of the shaft 36 passes through the hole 24a. Subsequently, the panel guide 32 is loaded on the disposed optical sheets 24.

Figure 6:
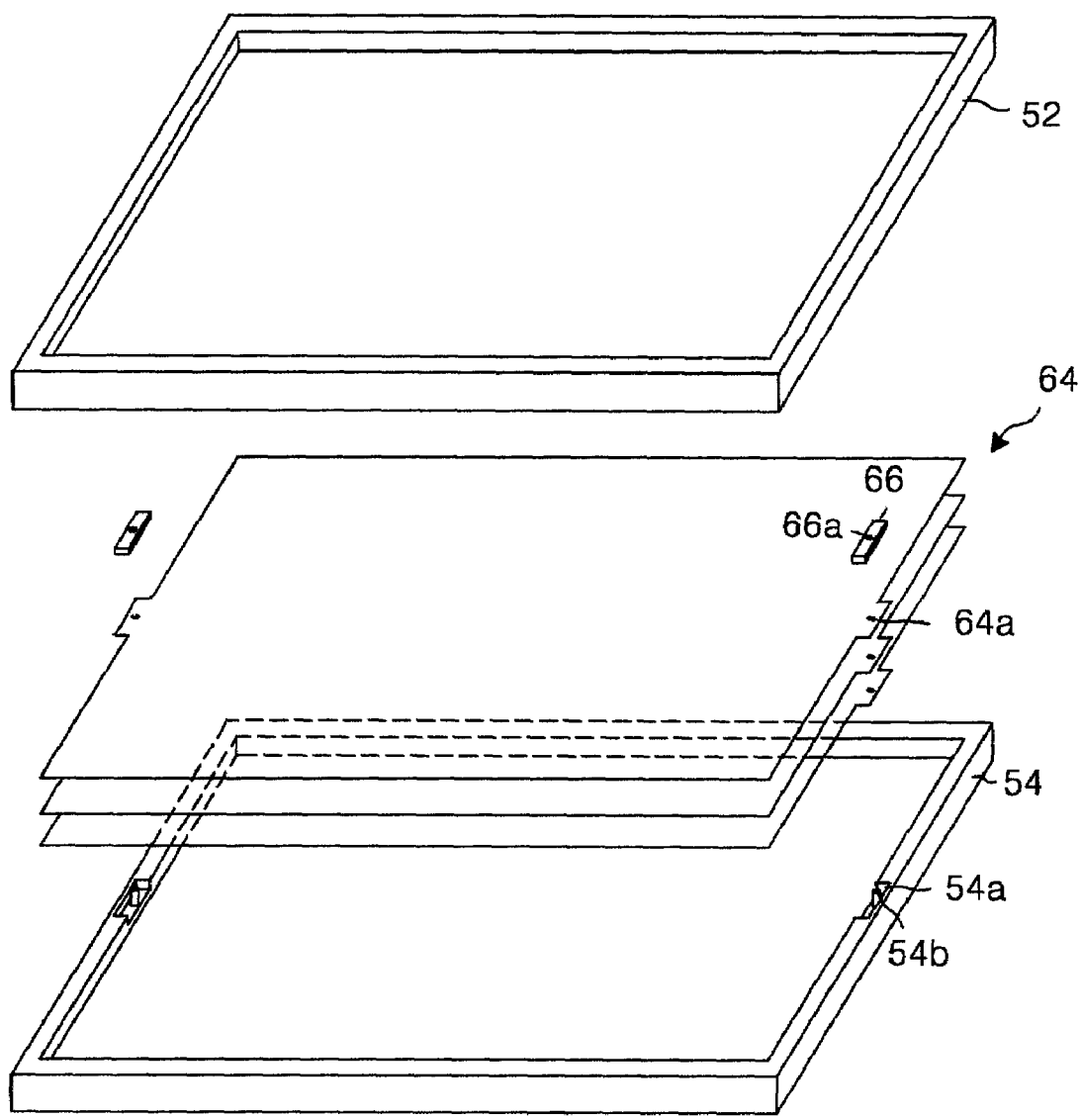
FIG. 6 is an exploded perspective view of a liquid crystal module according to another embodiment of the present invention.
Figure 7:
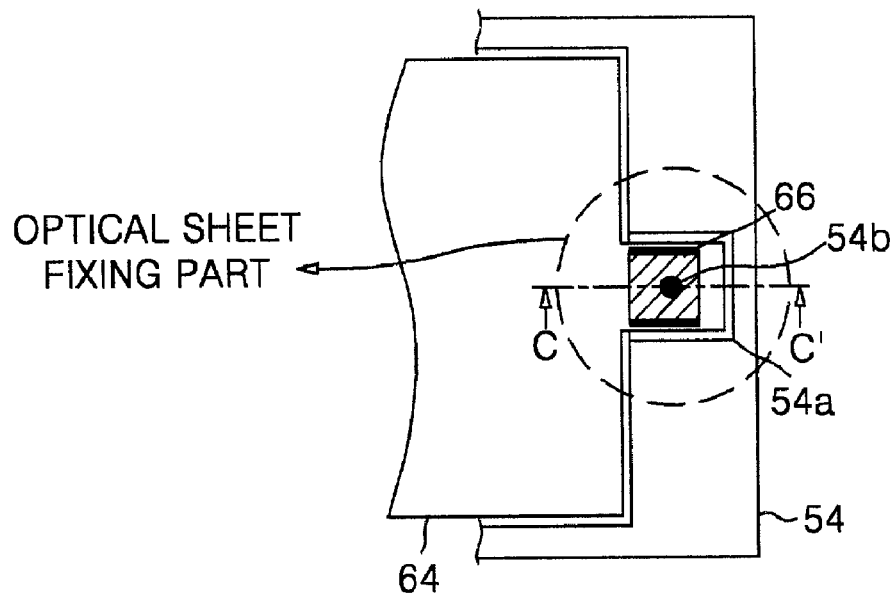
FIG. 7 is a detailed plan view of the optical sheet fixing part in the liquid crystal module shown in FIG. 6.
Figure 8:
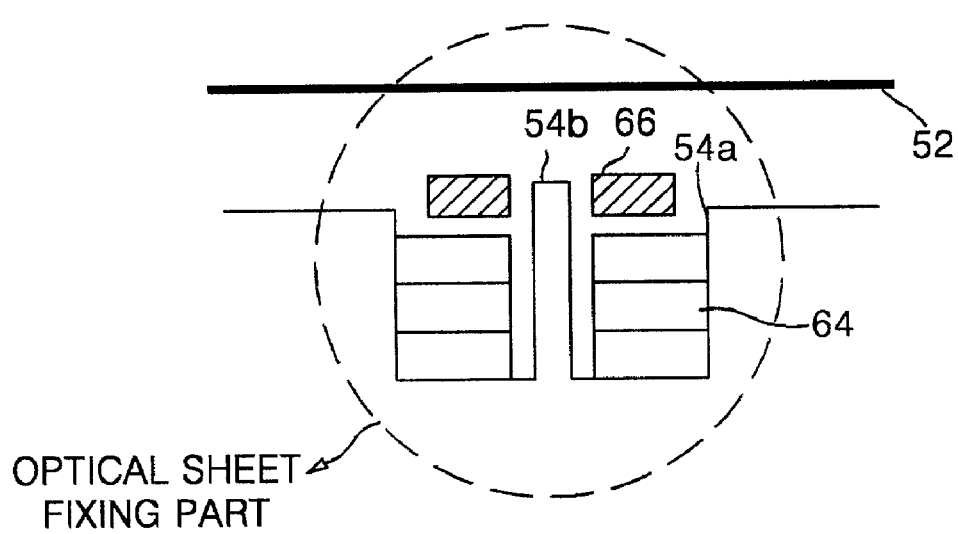
FIG. 8 is a section view of the optical sheet fixing part taken along the C–C' line in FIG. 7.

Referring to FIG. 6, there is shown an LCD according to another embodiment of the present invention. The LCD includes optical sheets 64 secured to a main frame 54, and a silicon pad provided between the optical sheets 64 and a panel guide 52. A reflective sheet is loaded on the bottom of the main frame 54, and a light guide, the optical sheets 64 and a liquid crystal panel are disposed thereon. The centers of both sides of the optical sheets 64 are secured to the main frame 54. To this end, stepped holes 54a are defined at the centers of both sides of the main frame 54, and a pin 54b is provided in each stepped hole 54a. Edges of the optical sheets 64 are extended into the outer side of the main frame 54, and the center of the extended part is provided with a hole 64a through which the pin 54b of the main frame 54 passes. A silicon pad 66 is made from an elastic silicon material, and the center of the silicon pad 66 is provided with a hole 66a through which the pin 54b of the main frame 54 passes. As shown in FIG. 7 and FIG. 8, this silicon pad 66 is engaged to the pin 54b inserted into the hole 64a of the optical sheets 64 in such a manner to be positioned between the optical sheets 64 secured to the main frame 54 and the panel guide 52.

Because the optical sheets 64 are secured to the main frame 54 by means of the pin 54b and is fixed with the panel guide 52 with the elastic silicon pad 66 therebetween, the present LCD undergoes almost no damage or wrinkling in comparison to the conventional LCD, in which the optical sheets 64 are fixed only by means of a double-face adhesive tape.

As described above, according to the present invention, the shaft is installed at the main frame and the optical sheets are inserted into the shaft to secure the optical sheets onto the main frame, or the elastic silicon pad is provided between the main frame and the panel guide to press and fix the optical sheets between the main frame and the panel guide. Accordingly, the present LCD is capable of preventing a damage of the optical sheets such as a scratch, etc. caused by motion of the liquid crystal display or external vibration, as well as minimizing wrinkling of the optical sheets generated under high temperature environment.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   optical sheets included in a backlight assembly;
   a main frame mounted with the backlight assembly;
   at least one shaft member installed at the main frame to fix the optical sheets;
   a panel guide, engaged in the shaft member, for surrounding the backlight assembly and the main frame; and
   at least one silicone pad provided on the optical sheets between the panel guide and the main frame,
   wherein the shaft member has a columnar shape; and
   wherein the silicone pad is provided with a hole through which the shaft member passes.

2. The liquid crystal display device as claimed in claim 1, wherein each of the optical sheets is provided with a hole through which the shaft member passes.

3. The liquid crystal display device as claimed in claim 1, wherein the main frame is provided with at least one stepped hole in which the shaft member is provided.

4. The liquid crystal display device as claimed in claim 1, wherein said shaft member has a protrusion, said protrusion having a width smaller than the width of said shaft member, said protrusion extending through said optical sheets.

5. The liquid crystal display device as claimed in claim 4, wherein each of the optical sheets is provided with a hole through which the protrusion extends.

6. The liquid crystal display device as claimed in claim 5, wherein said holes have a shape matching the shape of the cross-section of the protrusion.

7. The liquid crystal display device as claimed in claim 5, wherein said protrusion has a circular cross-section and said holes have a circular shape.

8. The liquid crystal display device as claimed in claim 4, wherein the panel guide has a hole formed therein through which said protrusion extends.

9. A liquid crystal display device, comprising:
a main frame;
a backlight assembly, mounted in the main frame;
at least one shaft connected to said main frame;
optical sheets included in the backlight assembly having holes therein configured to affix to the shaft; and
a panel guide, engaged in the shaft, for surrounding the backlight assembly and the main frame,
wherein the shaft member has a columnar shape.

10. The liquid crystal display device as claimed in claim 9, wherein said shaft has a protrusion, said protrusion having a width smaller than the width of said shaft, said protrusion extending through said holes in said optical sheets.

11. The liquid crystal display device as claimed in claim 10, wherein said holes have a shape matching the shape of the cross-section of the protrusion.

12. The liquid crystal display device as claimed in claim 10, wherein the shape of the cross-section of the protrusion and the shape of the holes are circular.

13. The liquid crystal display device as claimed in claim 10, wherein the panel guide has a hole formed therein through which said protrusion extends.

* * * * *